United States Patent [19]

Sykora

[11] Patent Number: 4,918,424
[45] Date of Patent: Apr. 17, 1990

[54] TWO-STAGE BRAKE LIGHT SYSTEM

[76] Inventor: R. Douglas Sykora, Rte. 6, Box 131, Potter Rd., Maryville, Tenn. 37801

[21] Appl. No.: 242,578

[22] Filed: Sep. 12, 1988

[51] Int. Cl.$^4$ .......................... B60Q 1/00; H01H 3/14
[52] U.S. Cl. .................................. 340/464; 200/61.89; 340/467; 340/479
[58] Field of Search ...................... 200/61.89, 531, 532, 200/536, 541, 542; 340/464, 479, 467

[56] References Cited

U.S. PATENT DOCUMENTS

| | | | |
|---|---|---|---|
| 1,673,206 | 6/1928 | Safely | 200/536 |
| 1,719,394 | 7/1929 | Daniel | 200/61.89 |
| 2,128,769 | 8/1938 | Finnell | 340/464 |
| 3,375,496 | 3/1968 | Antunovic | 340/467 |
| 3,492,638 | 1/1970 | Lane | 340/464 |
| 3,702,459 | 11/1972 | Bauchan | 340/467 |
| 4,149,141 | 4/1979 | Tanimura | 340/464 |
| 4,224,598 | 9/1980 | Ostrowski | 340/464 |
| 4,470,036 | 9/1984 | Doerr et al. | 340/464 |

Primary Examiner—J. R. Scott
Attorney, Agent, or Firm—Pitts and Brittian

[57] ABSTRACT

A two-stage brake light system (10) for a vehicle equipped with a brake pedal (12). The system (10) includes a power supply (14) such as a battery of an automobile. An improved switch (20) is provided which is responsive to the quantity of depression of the brake pedal (12). This switch (20) serves to energize a warning light (16) when the brake pedal (12) has been depressed by a first selected amount. The switch (20) also energizes a stop light (18) when the brake pedal has been depressed a selected second amount which is greater than the first selected amount. The switch (20) is designed such that it can be readily installed and adjusted to accommodate the particular mechanism to which it is responsive.

10 Claims, 3 Drawing Sheets

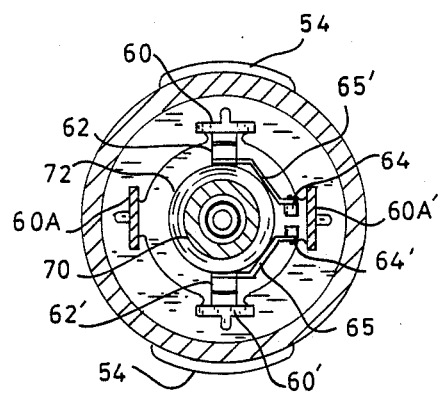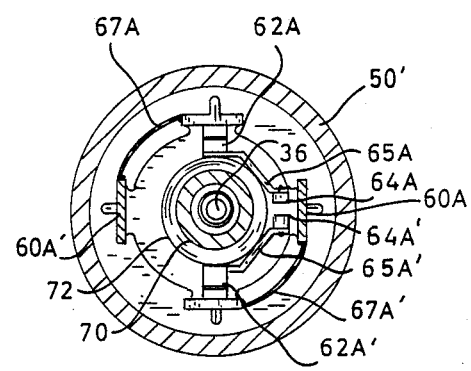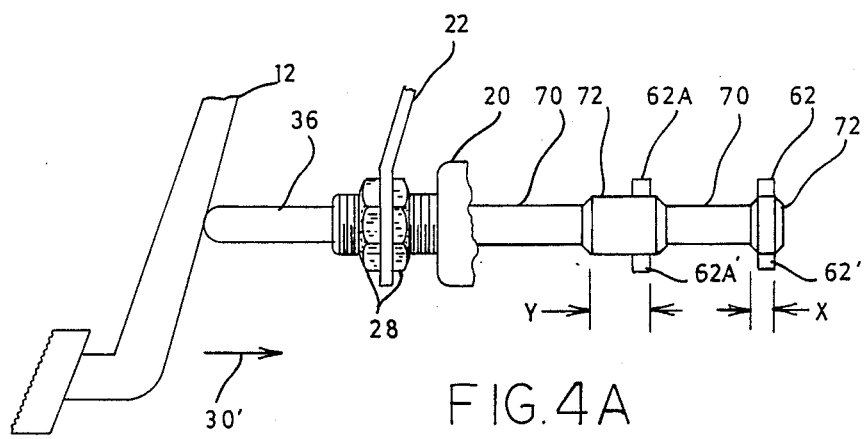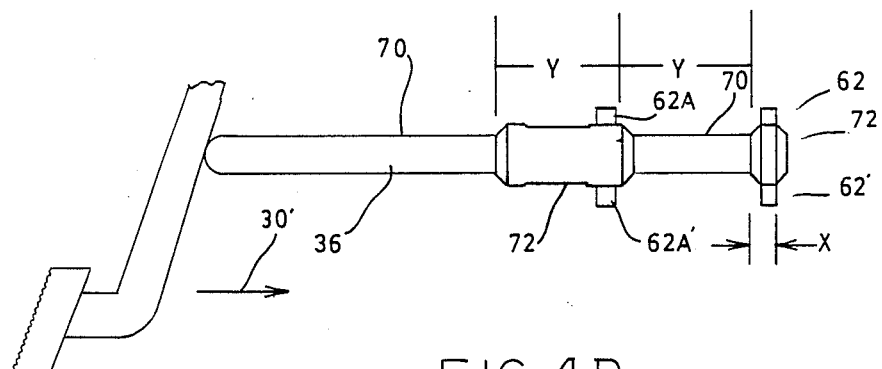

4,918,424

TWO-STAGE BRAKE LIGHT SYSTEM

TECHNICAL FIELD

This invention relates generally to brake lighting systems for vehicles equipped with a brake pedal, and more particularly concerns a two-stage lighting system having an improved switch responsive to the quantity of the depression of the brake pedal for energizing two stages of brake lights.

BACKGROUND ART

Vehicle brakes can be applied with varying degrees of force and stopping power. It is important for vehicle safety purposes for a trailing motorist to know the degree of braking forces applied by a leading motorist so the trailing motorist can determine how rapidly the leading car is decelerating. If the leading car is decelerating rapidly upon the application of braking forces, the trailing car needs to respond similarly if in close proximity. Similarly, if the leading car is decelerating slowly, the trailing car can likewise decelerate slowly.

While most vehicles on the market do not employ dual stage brake lighting systems to inform the trailing motorist whether the leading vehicle is applying little or great braking forces, various prior art devices have addressed this and similar problems. One know such prior art device is disclosed in U. S. Pat. No. 4,224,598 which was issued on Sept. 23, 1980, to Joseph F. Ostrowski. This device incorporates a signalling system which allows the trailing car to know whether the driver in front is accelerating, coasting or braking. In this regard, the system includes one switch which is activated by the accelerator of the vehicle and closed when the throttle of the vehicle is closed. It is opened when the throttle of the vehicle is opened. A further switch is connected to the brake pedal. Another device directed to a safety light warning system for vehicles is described in U. S. Pat. No. 4,470,036 issued on Sept. 4, 1984, to John F. Doerr, et al. This signal system has three modes of operation and includes a caution mode which will operate only when either the gas or the brake pedal is pressed. The go mode incorporates a switch activated by an accelerometer. Other known devices relating generally to the field of the present invention are described in the following U. S. Pat. Nos: 2,128,769, issued Aug. 30, 1938, to L. 0. Finnell; 3,375,496, issued Mar. 26, 1968, to A. J. Antunovic; 3,492,638, issued Jan. 27, 1970, to J. N. Lane; 3,702,459, issued Nov. 7, 1972, to M. L. Bauchan; and 4,149,141, issued Apr. 10, 1979, to K. Tanimura.

While the known prior art devices disclose 1 features which enhance the signalling capability of a leading vehicle to a motorist in a trailing vehicle, certain of the devices incorporate limitations which have prohibited wide spread use. For example, certain of the devices incorporate expensive components which can be repaired only by skilled technicians. Also, certain known prior devices are difficult to install and adjust, such that proper signals are transmitted to the motorist in the trailing vehicle.

Accordingly, it is an object of the present invention to provide a two-stage brake light system for a vehicle equipped with a brake pedal which is inexpensive to manufacture and easy to install. Moreover, the present invention is designed such that it can be used in connection with existing wiring and brake lights which are conventional equipment on most motor vehicles.

It is a further object of the present lighting system having a switch which is responsive to the quantity of depression of the pedal and which can readily be installed proximate thereto in a manner allowing adjustment to accommodate variations in the degree of depression required to produce given braking forces as the brakes gradually wear out.

DISCLOSURE OF THE INVENTION

Other objects and advantages will be obvious and will, in part, appear hereinafter, and will be accomplished by the present invention which provides an improved two-stage brake lighting system for a vehicle equipped with a brake pedal. The system includes a power source such as a battery of an automobile. A warning light is provided for signalling if the brake pedal has been depressed by a first selected amount. A stop light is provided for signalling that the brake pedal has been depressed by an amount greater than the first selected amount to indicate that the vehicle is coming to a rapid stop. A switch is mounted such that it is mechanically engaged with the pedal when the pedal is depressed. This switch energizes the warning signal when the brake pedal is depressed by the first selected amount. The warning signal is preferably an amber light. This switch also energizes a stop light, which is preferably red, when the brake pedal is depressed by a second selected amount which is greater than the amount required to energize the warning light.

BRIEF DESCRIPTION OF THE DRAWINGS

The above-mentioned features of the present invention will be more clearly understood from consideration of the following description in connection with the accompanying drawings in which:

FIGS. 3A and 3B illustrate a cross-sectional view taken along lines 3A—3A and 3B—3B, respectively, of FIG. 2.

FIGS. 4A-4B are diagrammatic illustrations of alternate embodiments of actuators for the improved switch means. These are similar to the embodiments of FIGS. 1A and 1B, respectively.

BEST MODE FOR CARRYING OUT THE INVENTION

Figure 1A:
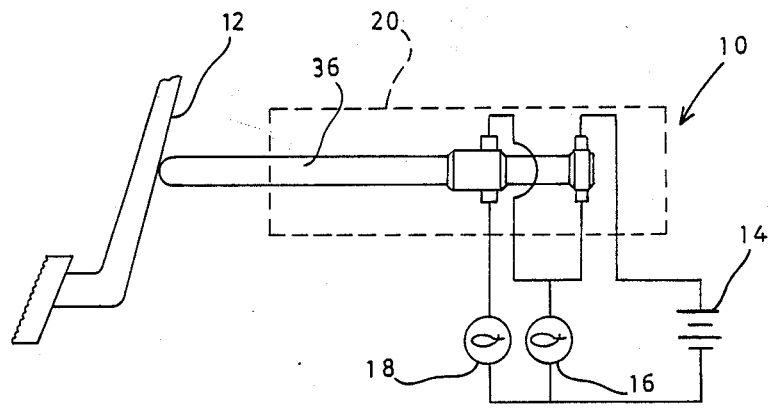
FIGS. 1A and 1B are diagrammatical illustrations of a two stage brake light system mounted such that it is in mechanical engagement with the brake pedal assembly.

Referring now to FIG. 1A, a two-stage brake light system constructed in accordance with various features of the present invention is illustrated generally at 10. This light system is designed for a vehicle equipped with a brake pedal which is illustrated diagrammatically at 12. It will be noted that the diagrammatically illustrated brake pedal 12 is shown to include a mounting bar. These brake pedals and mounting assemblies assume various geometries as they are manufactured by various motor vehicle companies. Accordingly, while a particular brake pedal configuration is illustrated, it is not intended to limit the scope of the applicability of the present two-stage brake light system.

As shown in FIG. 1A, the brake light system includes a power source such as the battery 14. This battery can comprise the battery of a motor vehicle which is conventionally 12 volts. The power source or battery 14 is electrically and a stop light 18. Preferably, the warning light 16 will be amber which is a conventional signal indicating caution, or in this case that the brakes have been applied or depressed at least by a first selected amount. The stop light 18 is preferably red indicating that the vehicle is coming to a rapid stop, that is, substantial braking forces are being applied and the pedal is depressed by a second selected amount which is greater than the first selected amount.

Figure 1B:
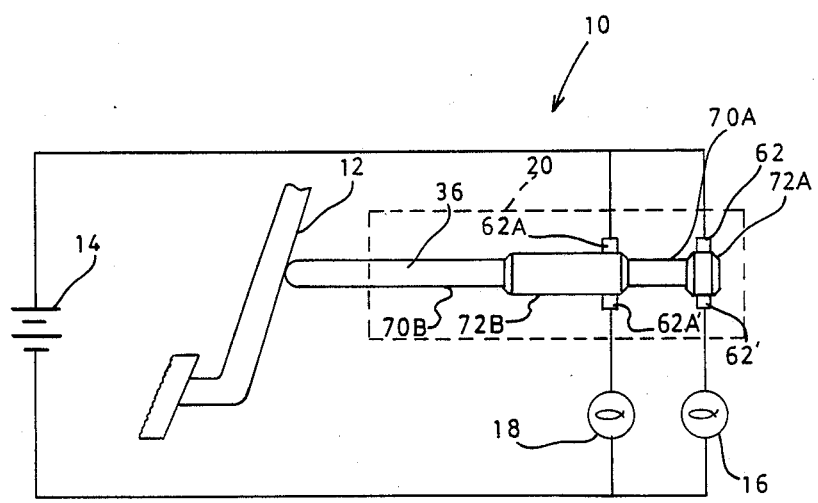
Figure 2:
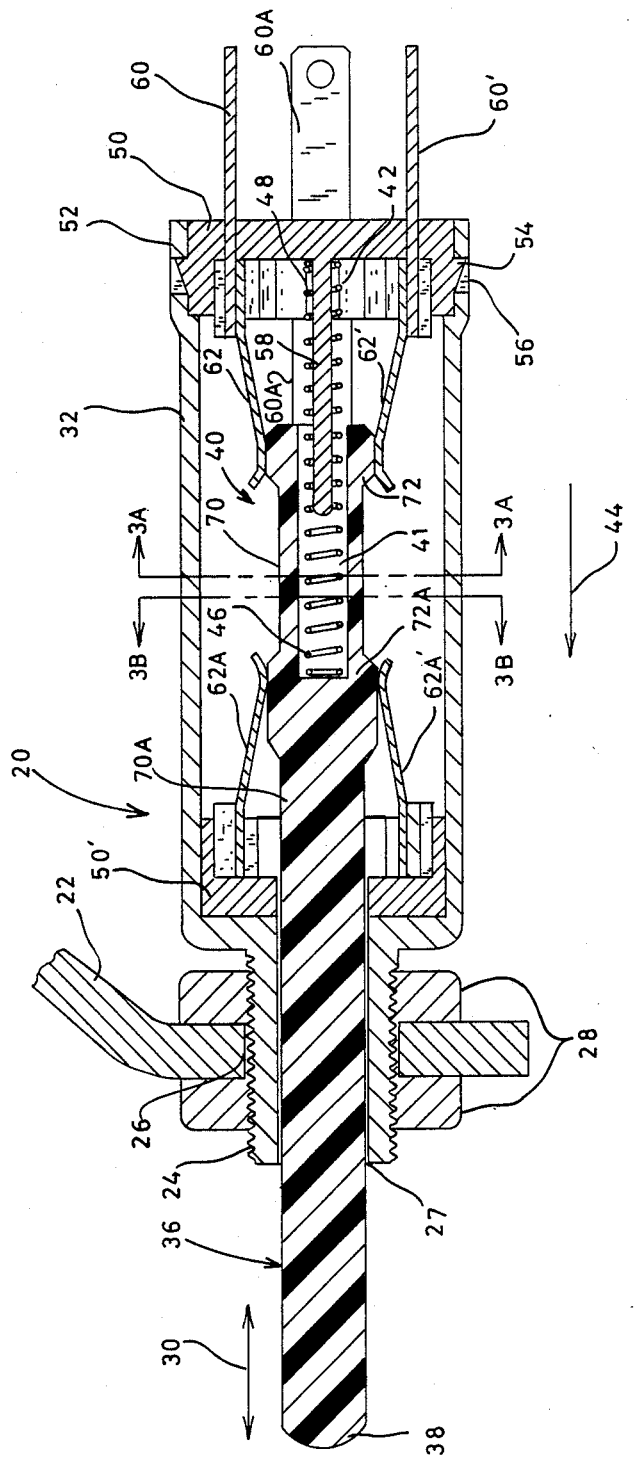
FIG. 2 illustrates a cross-sectional view of the switch shown in FIG. 1 which is responsive to the quantity of depression of the brake pedal.

In order to selectively energize the warning light 16 and the stop light 18, improved switch means generally indicated at 20 is provided. The illustrated switch means 20 is responsive to the quantity of the depression of the pedal such that the warning light 16 is connected to the power source 14 when the brake pedal is depressed by a first selected amount. The switch means 20 further serves to electrically connect the stop light 18 to the power source 14 when the bake pedal is depressed by a second selected amount which is greater than the first selected amount. Thus, a trailing vehicle is provided with a signal representative of the rate of deceleration of the leading vehicle. In other words, the trailing vehicle is signaled as to the strength of the braking forces applied by the leading vehicle's driver. To this end, the two-stage switch means 20 is mounted by, a suitable mounting bracket 22 onto the vehicle such that the switch. 20 is positioned for mechanical engagement as illustrated in FIG. 2 with the brake pedal (see FIGS. 1A and 1B). The mounting bracket 22 includes one end portion secured to the motor vehicle proximate the floor thereof or, for example, on the lower portion of the dash and/or frame, and a further end portion which is provided with a bore 26 for adjustably receiving the end portion of the switch 20. It will be noted that the end portion 24 of the switch 20 is externally threaded and extends through bore 26 of the mounting bracket 22. A pair of nuts indicated at 28 serve to releasably and adjustably mount the switch 20 onto the mounting bracket 22 proximate bore 26 such that the position of the switch 20 can be adjusted in the direction of the bi-directional arrow 30 for proper placement of the switch 20 in mechanical engagement with the brake pedal 12. Moreover, the adjustability feature allows for movement of the switch if necessary as the brake pads wear out or other variations in the stroke of the brake pedal take place through use.

An improved switch means constructed in accordance with various features of the invention is illustrated in cross-sectional view in FIG. 2. This figure illustrates that the switch 20 includes a switch housing 32 which terminates at end 24 in an externally threaded portion which is received within the bore 26 of the mounting bracket 22. This housing defines a bore 27 which slidably receives the switch actuator or plunger 36. This actuator includes end portion 38 which mechanically engages the brake pedal 12 in the preferred embodiment as is shown in FIGS. 1A and 1B. The opposite end portion 40 of the actuator 36 is mounted within the housing 32 as is shown in FIG. 2 and defines an internal cavity 41 which receives spring 42 that biases the actuator 36 in the direction of arrow 44. More specifically, this spring 42 includes a first end 46 which engages and operates against the actuator 36 as shown. The opposite end portion of the spring 42 is illustrated at 48, and acts against plug member 50 which closes the cavity of the housing 32. This plug member is preferably designed such that it forms a force fit with end portion 52 of the housing 32. In this regard, a detent 54 mechanically engages the cutout portion 56 such that the plug member 50 is secured for closing the housing 32. This plug member 50 carries in the preferred embodiment an elongated rod member 58 which slidably receives end portion 48 of the spring 42 for holding the spring in proper position for biasing the actuator 36. The plug member 50 carries a pair of pins 60 and 60' which extend outwardly from the housing 32 when the plug member 50 is mounted therein. These pins 60 and 60' are electrically connected with the contact actuators 62 and 62', respectively. These contact actuators can be moved towards and away from each other for closing the contacts 64 and 64', respectively. It will be noted in FIG. 3A that the contacts 64 and 64' are connected to their respective contact actuators 62 and 62' through electrically conductive arms 65 and 65', respectively. When the contacts 64 and 64' are engaging, an electrical circuit is completed through pins 60 and 60'. When the contacts 64 and 64' are separated, the electrical circuit through pins 60 and 60' is broken.

The opposite end portion of the housing 32 is provided with a similar plug member 50' which includes an opening proximate its central portion for slidably receiving the actuator 36 (see FIG. 3B). This plug member 50' carries contact actuators 62A and 62A' which are connected through electrically conductive contact arms 65A and 65A' similar to the arms shown in FIG. 3A to contacts 64A and 64A' (shown in FIG. 3B). These contacts are electrically connected through suitable wires 67A and 67A' to the pin 60A and a second pin not shown but similar to pin 60A. It will be noted in FIG. 2 that the end portion 40 of the actuator/plunger 36 has portions 70 of one diameter and portions 72 of a larger diameter. As can be seen in FIG. 2, when the contact actuators are on the portions of larger diameters, the operatively associated contacts are open and the electrical circuit is broken such that the lights will not be energized. Contrawise, when the contact actuators are positioned on the portions of the actuator 36 of smaller diameter, that is the portions indicated by the numeral 70, the contacts are made such that the electrical circuit will be completed for energizing the operatively associated light. This feature is more clearly illustrated in FIGS. 4A–4B. In these figures, the contact actuators 62, 62', and 62A, 62A', are illustrated diagrammatically. Moreover, it will be noted that the portions 72 of the actuator/plunger 36 having an increased diameter can be spaced or positioned along the length of the actuator/plunger 36 such that the warning light will be energized when the brake pedal is depressed by a first selected amount, and the stop light will be energized when the brake pedal is depressed by a second selected amount which is greater than the first selected amount. More specifically, referring to FIG. 4A, it will be noted that when the plunger 36 is activated in response to the depression of the brake pedal 12, the warning light will be energized when the plunger 36 moves by distance indicated at X, the distance required for the plunger 36 to move such that the contact actuators 62 and 62' are moved to portion 70 of lesser diameter. Also, it will be noted that the portion 72 of greater diameter of plunger 36 which is operatively associated with the contact actuators 62A and 62A' has a greater length such that these actuators remain in a position for keeping contacts 64A and 64A', and respectively, open until the plunger 36 is advanced by a distance indicated at Y. At this point, the contact actuators 62A and 62A' likewise move to a position of lesser diameter along the plunger 36 thereby causing contacts 64A and 64A' to close to energize the stop light 18.

In the embodiment shown in FIG. 4A, it will be noted that the warning light 16 and the stop light 18 will both be energized simultaneously. In this connection, referring to FIG. 1A, the light's first (warning light) and second (stop light) stage portions of the switch means are wired in series.

If it is desired to have the warning light deenergized when the stop light is energized, the system could be wired as shown in FIG. 1B. In this regard, light 16 will be energized when the portion 72A of the actuator 36 is moved until contact actuators 62 and 62' are positioned juxtaposed to the portion of the plunger of lesser diameter as indicated at 70A. When the pedal is depressed to an extent such that the contact actuators 62A and 62A' are juxtaposed to portion 70B of the plunger which is of lesser diameter, the stop light 18 will be energized and the warning light 16 will be deenergized if the portion 72B has advanced for again separating the contact actuators 62 and 62'. This principle is illustrated more clearly in FIGS. 4A and 4B, which disclose embodiments of the actuator/plunger 36 which could be used with the wiring diagram of FIG. 1B for deenergizing the warning light when the stop light is energized. More specifically, as shown in FIG. 4B, if the plunger is moved in the direction of the arrow 30 by an amount indicated by X, the contacts operatively associated with the actuators 62 and 62' will be closed. However, the contacts operatively associated with the contacts 62A and 62A' will remain open such that the stop light 18 is not energized until the plunger has been depressed by an amount equal to Y. If the amount Y also identifies the spacing between the portions 72A and 72B of increased diameter, when the stop light 18 is energized, the warning light 16 will be deenergized because its actuator arms are separated by the movement of portion 72B therebetween. It will be understood by those skilled in the art that alternate constructions or variations in the portions of the actuator 36 can be adjusted such that the lights function in a desired manner.

Thus, although there has been described to this point particular embodiments of the present invention of a two-stage brake lighting system for a vehicle equipped with a brake pedal, it is not intended that such specific references be considered as limitations upon the scope of this invention except insofar as set forth in the following claims and equivalents thereof.

I claim:

1. A two-stage brake light system for a vehicle equipped with a brake pedal, comprising:
   a power source;
   warning light means for signalling that said brake pedal has been depressed a first selected amount;
   stop light means for a signalling that said brake pedal has been depressed a second selected amount which is greater than said first selected amount;
   switch means mounted proximate said brake pedal responsive to the quantity of depression of said brake pedal such that said warning signal means is connected to said power source when said brake pedal is depressed by said first selected amount and such that said stop light means is connected to said power source when said brake pedal is depressed by said second selected amount, said switch means having a plunger which is mechanically engaged by said brake pedal when said brake pedal is depressed, a housing that defines an internal cavity which slidably receives a portion of said plunger therein, and biasing means disposed within said cavity for urging said plunger outwardly towards said brake pedal, said switch means further including first and second contact pairs, said first of said contact pairs being warning light contacts electrically connected with said warning light means and said second of said contact pairs being stop light contacts electrically connected with said stop light means, said warning light contacts being actuated by contact actuators to energize said warning light means from said power source when said plunger is moved with respect to said housing by said first selected amount, and said stop light contacts being actuated by further contact actuators to energize said stop light means from said power source when said plunger is moved with respect to said housing by said second selected amount, said contact actuators and said further contact actuators being displaced by the surface contour of said plunger.

2. The two-stage brake light system of claim 1 wherein said first and further contact actuators are electrically connected to said warning light and stop light contacts, respectively, said contact actuators being positioned within said cavity so as to mechanically contact said plunger at spaced locations on said contour whereby movement of said plunger relative to said housing by said first selected amount causes said warning light contact actuators to close said warning light contacts for energizing said warning light means, and whereby movement of said plunger with respect to said housing by said second selected amount causes said stop light contact actuators to close said stop light contacts for energizing said stop light means.

3. The two-stage brake light system of claim 2 wherein said plunger is elongated and said contour has portions of one diameter and portions of a larger diameter, said portions of larger diameter being positioned along the length of said plunger to mechanically engage said warning light and stop light contact actuators mounted within said housing such that operatively associated contacts are open such that said light means will not be energized when said contact actuators mechanically engage said portions of said plunger having said larger diameter, and wherein said contact actuators mechanically engage said plunger portions of said smaller diameter as said plunger moves with respect to said housing thereby causing said operatively associated contacts to be closed such that said light means will be energized.

4. A two-stage brake light system of claim 3 wherein spacing between said portions of said plunger having said larger diameter is such that said warning light means will be de-energized prior to energization of said stop light means.

5. A two-stage brake light system of claim 4 wherein said warning light means remains energized as said stop light means is energized.

6. A two-stage switch means for mounting in a vehicle proximate a brake pedal of said vehicle to provide selective energization of a warning light and a stop light by a power source depending upon the amount of depression of said brake pedal, which comprises:
   a housing means defining a cavity therein, said housing means provided with mounting means for mounting said housing proximate said brake pedal;

a substantially cylindrical plunger means having a portion slidable received within said cavity, said plunger means having a first end exterior said housing means for contact with said brake pedal whereby said plunger means is moved axially when said brake pedal is depressed, said plunger means having spaced-apart portions of a first diameter and spaced-apart portions of a second and larger diameter proximate a second end of said plunger means within said cavity;

biasing means disposed within said cavity for urging said plunger outwardly towards said brake pedal;

a first pair of contact actuators mounted within said cavity, said first pair of contact actuators for mechanical contact with the surface of said plunger means;

a second pair of contact actuators mounted within said cavity, said second pair of contact actuators for mechanical contact with said surface of said plunger means;

a first pair of contacts electrically connected to, and operated by, said first pair of contact actuators, said first pair of contacts electrically connected to said warning light, said first pair of contacts being open when said first pair of contact actuators are in contact with said portions of said second and larger diameter of said plunger means and closed when said first pair of contact actuators are in contact with said portions of said first diameter;

a second pair of contacts electrically connected to, and operated by, said second pair of contact actuators, said second pair of contacts electrically connected to said brake light, second pair of contacts being open when said second pair of contact actuators are in contact with said portions of said second and larger diameter of said plunger means and closed when said second pair of contact actuators are in contact with said portions of said first diameter;

said portions of said first and second diameters of said plunger means being spaced along said plunger means whereby said second pair of contact actuators contact said portions of said first diameter when said brake pedal is depressed a first amount whereby said warning light is energized from said power source, and whereby said first pair of contact actuators contact said portions of said first diameter when said brake pedal is depressed a second and larger amount whereby said stop light is energized from said source.

7. The switch means of claim 6 wherein said portions of said second diameter are positioned along said plunger means such that said warning light will be deenergized prior to energization of said stop light.

8. The switch means of claim 6 wherein said portions of said first diameter are positioned along said plunger means such that said warning light remains energized as said stop light is energized.

9. The switch means of claim 6 wherein said housing means is provided with external plug means electrically connected to said contact actuators for connecting said switch means into electrical circuits of said vehicle containing said warning light and said stop light.

10. A two-stage switch means for mounting in a vehicle proximate a brake pedal of said vehicle to provide selective energization of a warning light and a stop light by a power source depending upon the amount of depression of said brake pedal, which comprises:

a housing means defining a cavity therein, said housing means provided with mounting means for mounting said housing proximate said brake pedal;

a substantially cylindrical plunger means having a portion slidable received within said cavity, said plunger means having a first end exterior said housing means for contact with said brake pedal whereby said plunger means is moved axially in said cavity when said brake pedal is depressed and a second end disposed within said cavity, said second end of said plunger means defining a further cavity, said plunger means having spaced-apart portions of a first diameter and spaced-apart portions of a second and larger diameter proximate said second end of said plunger means within said cavity;

biasing means disposed within said further cavity for urging said plunger means outwardly towards said brake pedal;

a first pair of contact actuators mounted within said cavity, said first pair of contact actuators for mechanical contact with the surface of said plunger means;

a second pair of contact actuators mounted within said cavity, said second pair of contact actuators for mechanical contact with said surface of said plunger means;

a first pair of contacts electrically connected to, and operated by, said first pair of contact actuators, said first pair of contacts electrically connected to said warning light, said first pair of contacts being open when said first pair of contact actuators are in contact with said portions of said second and larger diameter of said plunger means and closed when said first pair of contact actuators are in contact with said portions of said first diameter;

a second pair of contacts electrically connected to, and operated by, said second pair of contact actuators, said second pair of contacts electrically connected to said brake light, said second pair of contacts being open when said second pair of contact actuators are in contact with said portions of said second and larger diameter of said plunger means and closed when said second pair of contact actuators are in contact with said portions of said first diameter; and electrical plug means mounted on an exterior surface of said housing means and electrically connected to said first and second pairs of contact actuators for connecting said switch means into electrical circuits of said vehicle containing said warning light and said stop light;

said portions of said first and second diameter of said plunger means being spaced along said plunger means whereby said second pair of contact actuators contact said portions of said first diameter when said brake pedal is depressed a first amount whereby said warning light is energized from said power source, and whereby said first pair of contact actuators contact said portions of said first diameter when said brake pedal is depressed a second and larger amount whereby said stop light is energized from said source.

* * * * *